United States Patent [19]

Doerfling

[11] 4,078,100
[45] Mar. 7, 1978

[54] COMPOSITE FOAM LAMINATE AND METHOD

[75] Inventor: Ralph G. Doerfling, Southfield, Mich.

[73] Assignee: Detroit Gasket Company, Oak Park, Mich.

[21] Appl. No.: 518,652

[22] Filed: Oct. 29, 1974

[51] Int. Cl.² .............................................. B05D 3/02
[52] U.S. Cl. ........................................ 427/314; 156/72;
264/45.5; 264/45.6; 264/54; 264/DIG. 77;
427/316; 427/322; 427/324; 427/407 R;
427/424; 427/425; 428/95; 428/97
[58] Field of Search ................ 428/85, 93, 95, 96,
428/97, 245, 260, 425; 427/314, 316, 322, 324,
407, 424, 425; 264/45.5, 45.6, 54, DIG. 77;
156/72

[56] References Cited

U.S. PATENT DOCUMENTS

| 3,251,092 | 5/1966 | Printz | 260/2.5 AZ |
| 3,525,662 | 8/1970 | Padgett | 156/72 |
| 3,576,706 | 4/1971 | Baumann | 428/425 |
| 3,728,182 | 4/1973 | Wisotzky | 428/95 |

*Primary Examiner*—Marion E. McCamish
*Attorney, Agent, or Firm*—Cullen, Settle, Sloman & Cantor

[57] ABSTRACT

The method of this disclosure permits the application of a foam layer, in fluid form, to a relatively porous substrate and the formation of a contoured foam laminate using a relatively rigid foam. The method includes heating the substrate prior to application of the fluid foam and forming the laminate in a die prior to completion of foaming. The laminate includes a flexible substrate, preferably a polyurethane foam layer and a lattice skrim located between the substrate and the exposed surface of the foam layer.

13 Claims, 4 Drawing Figures

COMPOSITE FOAM LAMINATE AND METHOD

Field of the Invention

The method of this invention is particularly suitable for forming flexible or rigid foam laminates, including foam backed carpet laminates. Rigid foam laminates may be used in automotive applications for example for contoured wheel covers, interior paneling and the like.

Foam-fabric laminates are presently formed by adhesive bonding a foam sheet to the fabric or casting a foam sheet upon a carrier and applying the fabric, under pressure, after foaming and prior to complete curing. Generally, an adhesive is still required. Where the foam is applied in a fluid form to a porous fabric or substrate, such as carpeting, the foam bleeds through the fabric during blowing. The need therefore remains for a method of applying fluid foam directly to a porous substrate, eliminating the requirement for casting the foam prior to application to the substrate and bonding.

Another problem in the prior art has been to form a contoured rigid foam-fabric laminate without wrinkling the fabric. Where the foam sheet is cast prior to application of the fabric, wrinkles are formed in the fabric. One technique to reduce wrinkles has been to utilize stretcher frames, which would require stretching of the fabric prior to application of the foam layer. Finally, it has been found difficult to cut or trim the foam-fabric laminates of the prior art because of the flexibility of the fabric relative to the foam. These and other problems of the prior art have been solved by the method and foam laminate of the present invention.

SUMMARY OF THE INVENTION

The method of forming a foam laminate of this invention eliminates the necessity of precasting a foam layer and the necessity of an adhesive bond between the foam and substrate, reducing the time, labor and apparatus for such operations. Further, the method of this invention forms a permanent, integral bond between the foam layer and substrate, reducing the chances of delamination.

The method of this invention may be utilized with substantially any substrate, including relatively porous fabrics such as carpeting. Further, relatively rigid foams and substrates may be formed into permanently contoured shapes, without pre-forming either the foam or substrate layers. As described, the method of this invention also substantially eliminates the problem of wrinkling of the substrate, during forming. Finally, the preferred method of this invention results in a unique foam laminate, which may be easily formed and trimmed without special equipment.

The method of this invention includes the steps of heating the surface of the substrate, such as a porous fabric, to which the foam is to be applied, applying a layer of foaming plastic to the heated substrate surface and completing the foaming of the plastic layer and curing the foam and substrate into an integral homogeneous foam-substrate laminate. In the preferred method of this invention, a first layer of foaming plastic is applied to the heated substrate surface, providing a blow barrier at the foam-substrate interface. A second layer of foamable plastic may then be applied immediately over the first foam layer, permitting the building of the foam layer into a layer of substantial thickness. As described, the substrate may be a relatively porous fabric. For example, the foam may be applied directly to the backing of a carpet, providing an integral foam backing for the carpet. The substrate is preferably heated to at least 100° F., but below the charring temperature of the substrate. The preferred foam in the method and laminate of this invention is a polyurethane foam, which may be a relatively rigid polyurethane foam, as described below.

Where the method of this invention is used to form a permanent contoured laminate, the plastic is preferably a relatively rigid polyurethane. The method of this invention then includes forming the laminate, preferably under heat and pressure, in a contoured shape, preferably in a matched set die, or the like. The laminate is received in the die immediately after applying the foam to the substrate, prior to complete foaming, wherein the foam is utilized as a forming media. The foaming plastic in the die aids in the forming of the contoured configuration of the laminate. Three method steps are then included in the forming die, including completion of the foaming, curing of the foam and shaping of the foam laminate. The resultant formed laminate is surprisingly free of folds and creases, which is believed to be caused by the compressive strength and pressure of the foam, wherein the strength of the foam and pressure offsets the tendency of the flexible substrate to wrinkle.

The substrate may also require trimming which has been a problem with the prior art primarily because of the difference in physical properties between the substrate and the foam layer. For example, when the foam is applied to a carpet, the carpet will tear during trimming and the foam will crack. This problem has also been solved by the improved foam laminate of this invention.

The preferred embodiment of the foam laminate includes the substrate, such as a carpet, a polyurethane foam layer permanently affixed to the substrate and a grid-like porous non-resilient skrim located within the polyurethane foam layer with the polyurethane foam continuous through the skrim and the skrim located between the substrate-polyurethane foam interface and the outer skin of the foam layer. The skrim is preferably flexible and non-resilient and permits the laminate to be easily trimmed without tearing of the substrate.

In the method of this invention, the skrim is disposed over the face of the substrate which is to receive the foam layer and the substrate may be heated through the skrim, as by radiant heating. The foam layer is then sprayed or otherwise applied through the skrim, causing the skrim to "float" in the foam layer. Where two layers of foam are applied to the substrate, for example, the skrim will float at least one-third of the distance between the substrate and the exposed skin of the foam, preferably near the skin of the foam. The size of the skrim grid openings should therefore be selected to cause the skrim to float, as desired.

Other advantages and meritorious features of the disclosed foam laminate and method of this invention will be more fully understood from the following description of the preferred embodiments and methods of this invention, the appended claims and the drawings, a brief description of which follows.

DESCRIPTION OF THE PREFERRED FOAM LAMINATE AND METHODS OF THIS INVENTION

Figure 1:
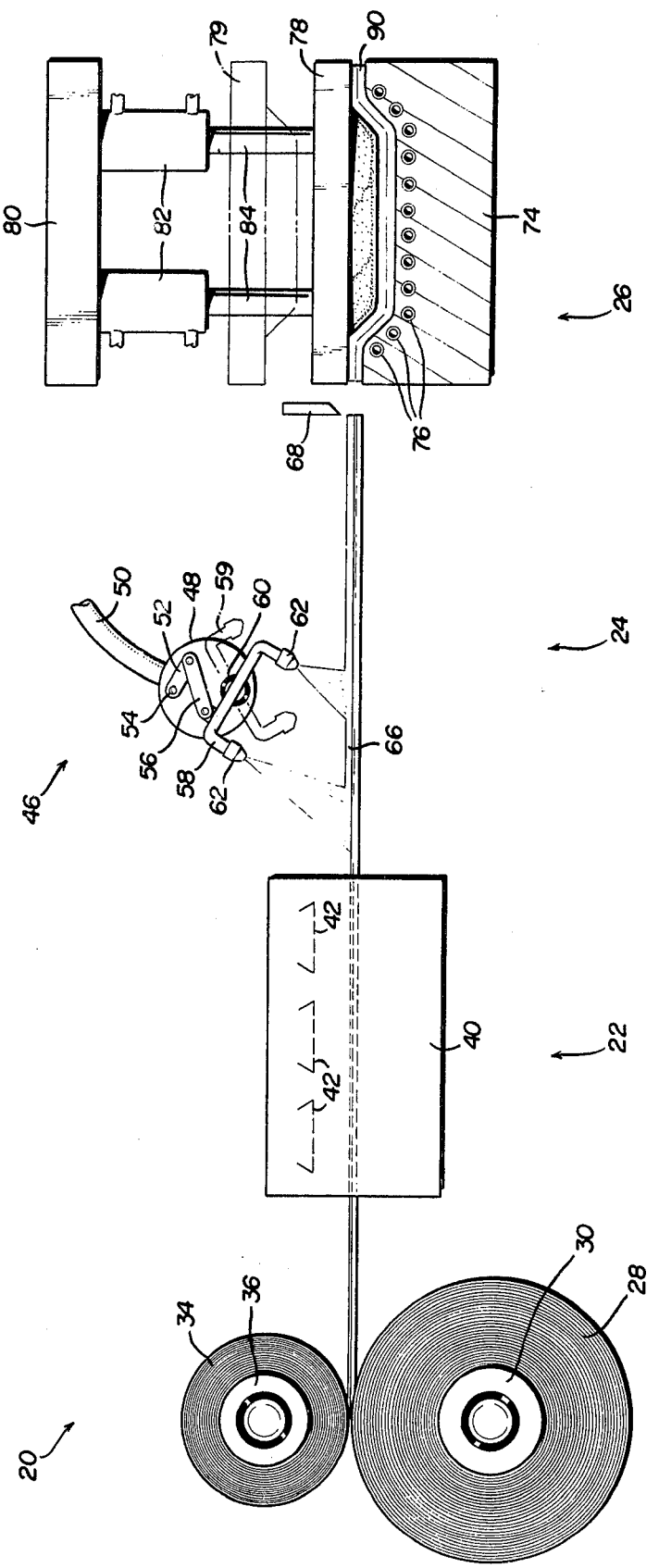
FIG. 1 illustrates a process line suitable for carrying out the process of this invention.

The process line 20 shown in FIG. 1 includes a heater station 22, a foam application station 24 and a forming station 26. The process illustrated in FIG. 1 applies a foam backing to a carpet section and forms the carpet section into a contoured shape, such as a self-supporting automotive interior wheel cover used in a stationwagon, fastback or the like. It will be understood however that the process of this invention may be utilized to form various types of laminates, as will be described more fully below.

In the process line shown in FIG. 1, carpeting 28 is continuously fed from a roller 30 and skrim 34 is fed from roller 36, over the carpeting, to heater 40 of heater station 22. The heater may be a conventional radiant heater having a plurality of radiant heaters 42, heating the carpet backing prior to application of the foam. The heaters will also dry the carpet, removing entrained moisture which may be detrimental to the foam or laminate.

Heating of the substrate, which in this case is a relatively porous carpet, eliminates the problem of the foam "bleeding" through the carpet upon application of the foam. When the foam contacts the heated carpet backing, it begins to foam immediately, forming a blow barrier and preventing the foam from bleeding through or penetrating the carpet. As described above, this has been a particularly difficult problem in the application of a foam layer directly upon a porous substrate, such as a carpet. When the carpet is heated, the foam expands upwardly or away from the carpet, providing a bridge without substantial penetration. Further, a mechanical interlock is provided between the porous substrate and the foam layer, providing excellent adhesion. Where the substrate is a carpet, the foam forms a tuft lock, actually improving the tuft retention of the carpet.

The preferred temperature to which the substrate is heated will depend upon the heat stability of the substrate and the particular foam utilized. In most applications, the temperature of the substrate should be at least 100° F. and should preferably be greater than 120° F. In the application of a polyurethane foam to a conventional carpet backing, the preferred temperature range is between about 120° and 150° F. The heated carpet and skrim is then received in the foam application station 24.

In the disclosed embodiment of the process line 20, foam is applied to the heated carpet backing by a reciprocating nozzle assembly 46. The nozzle assembly includes a drum 48 having an inlet pipe 50 receiving the constituents of the foamable plastic. In a conventional spray nozzle assembly, the constituents of the foam are mixed at the spray nozzle. The nozzles are reciprocated by a conventional linkage, including a power link 52 driveably connected to a drive shaft 54 and pivotally connected to a follower link 56. The follower 56 is pivotally connected to nozzle tube 58, which is pivotally connected to the drum at 60. Drive link 52 is thus rotated about drive shaft 54, pivotally reciprocating nozzle tube 58 from the position shown to the position shown in phantom at 59. The constituents of the foamable plastic are received through tube 50, mixed in drum 48 or previously mixed and sprayed on the heated carpet backing through nozzles 62. It will be understood that any suitable method may be used to apply the foam to the heated carpet backing, including casting with a metering knife, or the like. The preferred method however includes spraying the foamable plastic laterally or axially on the carpet because the thickness of the foam may be built-up by two or more passes of the disclosed reciprocating nozzle.

Where the foam is applied to a heated porous substrate by spraying through a reciprocating nozzle, the porous substrate is first impregnated with foam, forming a blow barrier and mechaical interlock as described above. In the second pass of the reciprocating nozzle, the foam is applied over the impregnated backing, building-up an integral, homogeneous foam layer. The thickness of the first layer of foam applied to the substrate will primarily depend upon the porosity and temperature of the substrate, but will also depend upon the type of foam used. Where the foam is applied to a conventional carpet and is heated to between about 120° and 150° F., as described above, the foam may be applied in thicknesses of about one-quarter inch foamed thickness per pass of the reciprocating nozzle, forming foam layer 66 shown in FIG. 1.

The foam used in the method of this invention will depend upon the particular application of the composite laminate. A flexible polyurethane foam may be preferred for conventional carpet backing. A relatively rigid polyurethane foam having a density of about two pounds per cubic foot has been found suitable for the automotive applications described above. One example of a suitable rigid polyurethane foam includes an isocyanate component comprising 90% polymeric isocyanate and 5 to 10% inert flame retarder and a resin or polyol component comprising 60 to 70% polyether polyol, 20 to 30% fluorocarbon 11-B (trichlorofluoromethane) and approximately 1% silicone surfactant and metal or acid salt catalyists. This foam composition may be purchased from Urechem Corporation. Other suitable rigid and flexible polyurethane foam compositions are disclosed in British Pat. No. 1,306,372 of the Union Carbide Corporation.

The composite laminate may then be cured by conventional means. Where a rigid polyurethane foam is utilized and the laminate is to be permanently formed into a contoured shape, the laminate is immediately inserted into a die, such as shown at forming station 26, prior to complete foaming and curing of the foam. A cutting blade 68 is shown in FIG. 1, which cuts the laminate into sections suitable for receipt in the die. It is understood however that the carpet and skrim may be pre-cut into suitable sections, prior to receipt in the heating station 22 or the entire process may be continuous.

The die assembly shown in forming station 26 is a conventional matched set die assembly, including a lower platen or die 74 having conventional heat transfer coils 76 located within the die platen adjacent the interface between the lower platen 74 and the upper platen 78. The upper platen 78 is supported in the disclosed embodiment by frame 80 having conventional hydraulic rams 82 including pistons 84. Pressure is applied to the upper platen by extending piston rods 84 and the die is opened by retracting piston rods 84, as shown in phantom at 79.

As described above, the foam-carpet laminate is placed in the die as soon as the final foam layer is applied. The die opens immediately upon completion of the last pass of the reciprocating nozzle, the laminate is inserted and the die is closed.

Three steps are carried out in the forming die, including (1) completion of foaming, (2) curing of the foam and (3) shaping of the foam laminate. This method of the invention thus utilizes the foam as a forming media. Where the foaming is completed in the die, substantial pressures result and the pressure aids in the forming of the contoured configuration of the laminate. As described above, this is believed to be caused by the compression strength and pressure of the foam. The resultant contoured foam laminate is substantially free of folds and creases.

A suitable die for the method of this invention, as described, applies 8 to 10 pounds per square inch pressure. In the disclosed embodiment, the die is also heated by passing steam or other fluid medium through the heat transfer coil 76. The die may be heated to a temperature of about 150° F. using conventional steam. It is understood that the method of forming of this invention may also be utilized to form foam laminates having relatively rigid impervious substrates. For example, contoured shapes may be formed using substrates such as coated asphalt impregnated craft or chip board, cardboard and the like. The foam will form a permanent bond to such materials in the method of this invention.

The method of this invention may also include a final trimming step, not shown, using a conventional trimmer blade, such as shown at 68 in FIG. 1. The foam laminate of this invention is particularly adapted to permit easy trimming, which is a problem in a foam laminate having a relatively resilient substrate, such as carpet. The utilization of a non-resilient skrim, retained in position within the foam layer, permits cutting of the laminate without tearing of the carpet. Further, a relatively ridig foam, such as a rigid polyurethane foam, will break easily when apart from the composite laminate of this invention, particulary under compressive stress. The utilization of a non-resilient skrim has solved this problem.

Figure 2:
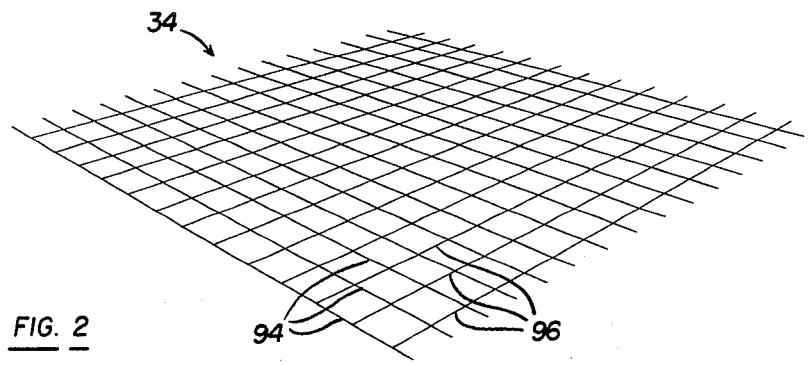
FIG. 2 is a top perspective view of a skrim which may be utilized in the process and foam laminate of this invention.

A suitable skrim for the foam laminate of this invention is shown at 34 in FIG. 2. The preferred skrim is formed of non-resilient polyester strands, such as the interwoven perpendicular strands 94 and 96 shown in FIG. 2. Skrim of this type are available commercially from various source. In the method of this invention the skrim is received on top of the carpet backing as shown in FIG. 1 and the carpet backing is heated through the skrim. Finally, the foamable plastic is sprayed through the skrim in the foam application station 24, causing the skrim to "float" upwardly of away from the carpet backing as the foam expands. The size of the skrim grid openings should therefore be selected to cause the skrim to float, as desired. A skrim having perpendicular strands defining apertures of one-eighth to one-quarter inch, measured from cross-over points, has been found suitable for the foam laminate of this invention. In this embodiment, the skrim floats until it is located at least one-third of the distance between the carpet backing 100 and the skin 98 of the foam as shown in FIG. 4.

Figure 3:
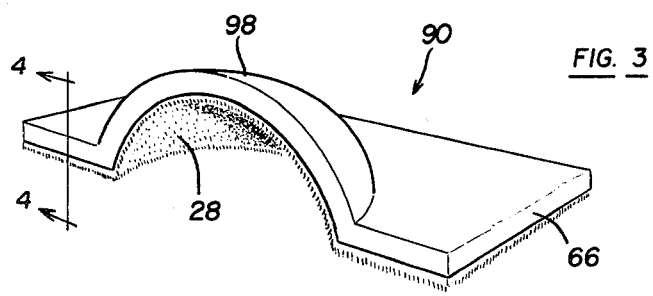
FIG. 3 is a top perspective view of the foam laminate of this invention formed by the method disclosed in FIG. 1.
Figure 4:
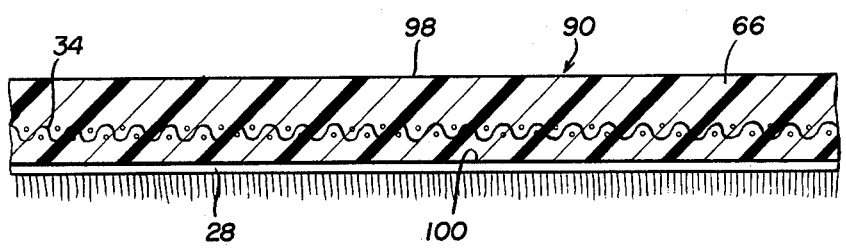
FIG. 4 is a side cross-sectional view of the laminate shown in FIG. 3, in the direction of view arrows 4—4.

The foam laminate shown in FIGS. 3 and 4 has been formed by the method of this invention. The laminate 90 includes a contoured portion 96 formed in the forming station 26 of FIG. 1. As described above, the carpet portion 28 is formed free of folds, creases or the like and the foam portion 66 is permanently affixed to the back or reverse side of the carpet 100 and is homogeneous, although applied in plural passes of the reciprocating nozzle assembly 46. The contoured foam laminate is formed of a relatively rigid polyurethane, such as described above and will retain the contoured shape after repeated flexing. The foam alone is difficult to cut because it is subject to cracking or breaking and the carpet alone is more easily torn than cut. The foam laminate 90 however may be easily trimmed, primarily because of the non-resilient skrim.

It will be understood that the improvements of the method of this invention may be used individually or in combination to produce foam laminates other than the foam laminate shown in FIGS. 3 and 4. For example, a flexible foam may be applied to a carpet backing or other relatively porous fabric materials. Alternatively, an impervious substrate may be used in combination with a relatively rigid foam which is then formed into a permanently contoured shape as described above. The skrim may not be used in certain applications, particularly where strength is not a factor or a non-resilient substrate is used.

I claim:

1. A method of permanently applying a plastic foam backing to a relatively porous substrate, including the steps of:
   a. heating the relatively porous substrate to which the foam is to be applied;
   b. applying a layer of foaming plastic in fluid form to the heated substrate surface, the plastic foam on the heated substrate providing a blow barrier at the foam-substrate interface;
   c. completing the foaming of said foam plastic layer and curing into an integral homogeneous foam-substrate laminate.

2. The method defined in claim 1, wherein said porous substrate is heated to at least 100° F. and below the charring temperature of said substrate.

3. The method defined in claim 1, wherein said porous substrate is a carpet and said plastic is applied to the back of said carpet, including heating the carpet backing to between about 120° and 150° F.

4. The method defined in claim 3, wherein said plastic foam is a polyurethane.

5. The method defined in claim 4, wherein said plastic foam is a relatively rigid polyurethane, including the additional method step of simultaneously forming the laminate, under heat and pressure, into a contoured shape, and completing the foaming of said polyurethane and curing of same.

6. The method defined in claim 1, wherein the plastic foam is applied to said porous substrate by spraying a foaming plastic upon the heated substrate.

7. The method defined in claim 6, wherein the foaming plastic is applied in two layers, including spraying a first layer over the heated substrate, forming a blow barrier and applying a second layer of foam over the impregnated substrate.

8. The method defined in claim 7, wherein said foamable plastic is applied to said porous substrate through a reciprocating nozzle, wherein said first layer is applied in the first pass of said nozzle and the second layer is applied in the return pass 9. The method defined in claim 1, including laying a relatively porous skrim over said surface, prior to applying said foaming plastic layer, causing the skrim to float within the polyurethane laminae during foaming and prior to complete curing.

10. A method of forming a contoured laminate, comprising the steps of:
   a. a heating a relatively porous carpet,
   b. applying a foamable relatively rigid polyurethane, including a foaming agent, to the back face of said carpet,
   c. forming the polyurethane-fabric laminate in a die under pressure and heat, prior to complete foaming of the polyurethane, simultaneously curing and completing the foaming of the polyurethane layer and forming the contoured shape in the laminate, without wrinkling the carpet substrate.

11. The method defined in claim 10, wherein the polyurethane is applied in two layers, including applying a first layer over the heated carpet back, providing a blow barrier and applying a second layer prior to complete foaming of the first layer.

12. The method defined in claim 10, including layer a relatively porous skrim over the substrate, prior to the application of the foamable polyurethane and permitting the skrim to float within the polyurethane foam, during foaming, providing a composite lamiante with the skrim located between the substrate-foam interface and the foam outer skin.

13. The method defined in claim 12, including trimming the laminate, after curing with a blade, wherein the skrim is non-resilient and prevents tearing of the carpet.

* * * * *